Sheet 1.
2 Sheets.

C. W. Williams.
Corn Harvester.
Nº 69,600      Patented Oct. 8, 1867.

Witnesses.
S. L. Potter
Charles Partridge

Inventor.
C. W. Williams

C. W. Williams.
Corn Harvester.
No. 69600            Patented Oct. 8, 1867.

Sheet 2.
2 Sheets.

Witnesses.
S. L. Potter
Charles Partridge

Inventor.
C. W. Williams.

UNITED STATES PATENT OFFICE.

CHARLES W. WILLIAMS, OF WYANDOTTE, MICHIGAN.

IMPROVEMENT IN CORN-HARVESTERS.

Specification forming part of Letters Patent No. 69,600, dated October 8, 1867.

*To whom it may concern:*

Be it known that I, CHARLES W. WILLIAMS, of Wyandotte, in the county of Wayne and State of Michigan, have invented a new and useful Improvement in Corn-Harvesters; and I do declare that the following is an accurate description thereof, reference being had to the accompanying drawings, and to the letters of reference marked thereon, and being a part of this specification.

Figure 1:
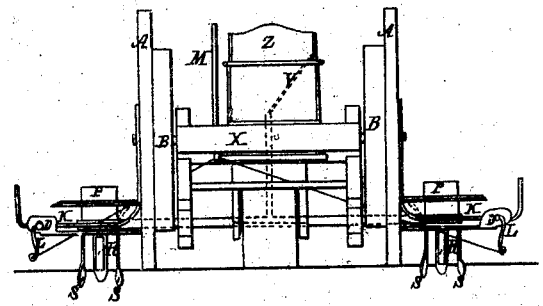
Figure 2:
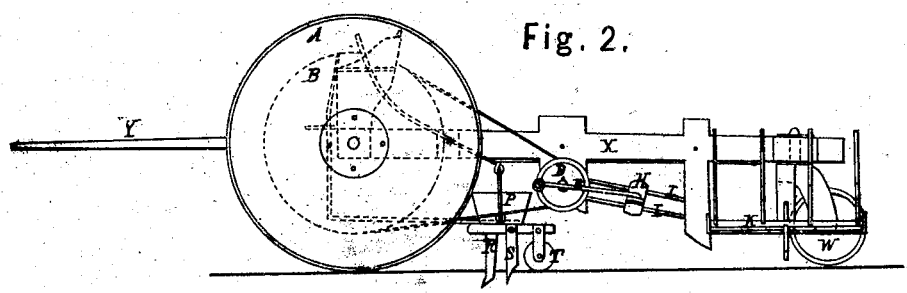
Figure 3:
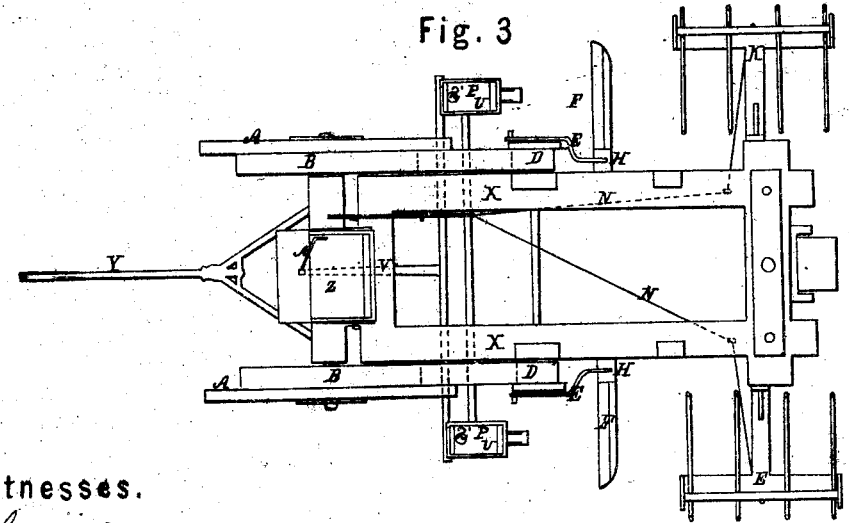
Figure 4:
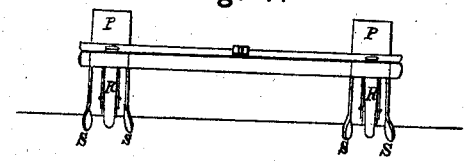
Figure 5:
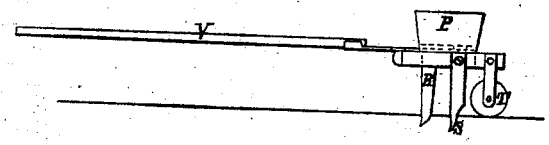
Figure 6:
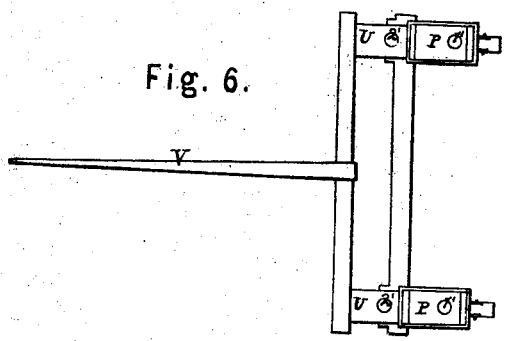

Figure 1 is a front-end view of my invention. Fig. 2 is a side elevation of the same. Fig. 3 is a top view of the same. Fig. 4 is a rear view of the planter. Fig. 5 is a side view of the same. Fig. 6 is a top view of the same.

The same letters refer to similar parts in each figure.

My invention consists in so constructing a corn-harvester that it will run between two rows of corn, cut it up, and deposit it in sheaves on each side of the machine. I also so construct a planting attachment that when it is required to be used in planting corn, beans, or any similar seed in rows it can be attached to the harvester, and easily detached when not required.

Having thus described the use of my invention, I will now proceed to explain its various parts and the manufacture of the same.

A A are the driving-wheels, which sustain the frame of the machine, x x, &c., to which are attached the working parts.

B B are drums, attached to the inner side of the driving-wheels A A, and communicate motion to the pulleys D D by the connecting-belts C C.

To the pulleys D D are attached connecting-rods E E, which give motion to the cutting-knives F F. These knives are fastened to the cross-heads H H, which work upon the guide-rods I I. After being cut by the knives F F, the corn-stalks fall upon the oscillating tables K K, which are operated by the levers L L and pivots O O.

When it is desirable to empty the tables K K, it can be done by the driver pulling the lever M, which is connected with the levers L L by proper chains, ropes, or rods, N N. By pulling the lever M the tables K K are turned, and deposit the stalks, in sheaves of a suitable size for binding, on each side of the machine.

W is an iron caster-wheel, to support the rear end of the machine and facilitate its turning.

Z is the driver's seat, and Y is a proper pole or shaft, to which to attach the horse or horses to draw and operate the machine.

What I claim as my invention, and desire to secure by Letters Patent, is—

The combination of the driving-wheels A A, provided with drums B B, the belts C C, pulleys D D, connecting-rods E E, knives F F, cross-heads H H, guide-rods I I, oscillating tables K K, levers L L and M, rods N N, caster-wheel W, seat Z, pole Y, with the frame X X, arranged substantially as described, for the purpose designed.

CHARLES W. WILLIAMS.

Witnesses:
   H. N. SWEENY,
   H. G. SPRAGUE.